United States Patent [19]

Blitzer

[11] 3,890,431

[45] June 17, 1975

[54] SO₂ REMOVAL FROM GASES

[75] Inventor: Sidney M. Blitzer, Baton Rouge, La.

[73] Assignee: Ethyl Corporation, Richmond, Va.

[22] Filed: Oct. 4, 1973

[21] Appl. No.: 403,420

[52] U.S. Cl. .................. 423/575; 423/243; 55/73; 210/21
[51] Int. Cl. ............................................ B01d 53/34
[58] Field of Search ........ 423/243, 575, 539; 55/73; 210/21

[56] References Cited
UNITED STATES PATENTS

| | | | |
|---|---|---|---|
| 2,729,543 | 1/1956 | Keller | 423/575 |
| 3,598,529 | 8/1971 | Deschamps et al. | 423/575 |
| 3,757,488 | 9/1973 | Austin et al. | 55/73 |
| 3,798,309 | 3/1974 | Knowles et al. | 55/73 |

*Primary Examiner*—G. O. Peters
*Attorney, Agent, or Firm*—Donald L. Johnson; John F. Sieberth; Shelton B. McAnelly

[57] ABSTRACT

A process for recovering SO₂ is disclosed. It involves reacting SO₂ or a system containing SO₂ with carboxymethoxy-succinic acid or a water soluble salt thereof to form an aqueous solution complex containing SO₂ and carboxymethoxysuccinic acid or a water soluble salt thereof. The complex thus obtained may be treated to remove the sulfur and regenerate the carboxymethoxysuccinic acid or water soluble salt thereof providing a cyclic process.

10 Claims, No Drawings

SO₂ REMOVAL FROM GASES

BACKGROUND OF THE INVENTION

This invention relates to the recovery or removal of $SO_2$ from various mixtures containing $SO_2$.

The recovery of $SO_2$ is a problem that has existed for a long time. Although water itself will absorb $SO_2$, its absorption capacity and retention ability are quite limited. U.S. Pat. Nos. 2,142,987 and 2,729,543 describe the removal of $SO_2$ from gases by contacting the gases with a liquid absorbent. Absorbents used in the prior art include various acids or salts thereof, such as citric acid, usually in aqueous solutions. Upon contact with $SO_2$, the aqueous absorbent solutions may form complexes containing $SO_2$ and thereafter must be treated to remove the $SO_2$ to permit recycle of the expensive absorbent. Removal of the $SO_2$ can be accomplished in several ways, typically by heating or by chemical reaction. A typical chemical reaction for removal of absorbed $SO_2$ utilizes $H_2S$ to produce a colloidal suspension of sulfur which is recoverable from the absorbent solution by filtration and/or decantation. Although losses of acids or salts can be minimized by recycling the absorbent after the $SO_2$ removal, some acid or the salt thereof is usually lost by vaporization or decomposition in the heating or by occlusion in the colloidal sulfur product.

Since most of the more effective prior art absorbents are expensive making such losses prohibitively expensive in many instances, a highly desired improvement in the art is the provision of a $SO_2$ collection process using a new, effective, low cost absorbent material.

SUMMARY OF THE INVENTION

In accordance with the invention, a process is provided for collecting $SO_2$. In one aspect of this process, gaseous $SO_2$ is contacted with an aqueous solution of carboxymethoxysuccinic acid (CMOS) or a water soluble salt thereof to produce an aqueous solution complex containing $SO_2$ and carboxymethoxysuccinic acid or the water soluble salt thereof. The complex thus obtained is preferably treated to recover the carboxymethoxysuccinic acid or salt so that it can be recycled for collection of additional quantities of $SO_2$. A preferred treatment of the complex is with $H_2S$. The $H_2S$ reacts with the sulfur constituency of the complex to liberate colloidal sulfur and regenerate carboxymethoxysuccinic acid or the salt thereof. Such regenerated acid or salt is obtained and recycled conveniently as an aqueous solution, to which end the salt preferably is an alkali metal salt of carboxymethoxysuccinic acid. Typical salt cations are sodium, potassium, and lithium, especially sodium because of its convenient reactivity with carboxymethoxysuccinic acid and its low cost.

Although the foregoing process is usable with gaseous streams or mixtures containing large percentages, even 100 percent of $SO_2$, usually such a concentrated stream would be a reactant for an ancillary process. Thus the usual and preferred manner of performing the present process is with a gas or vapor stream wherein the gaseous $SO_2$ is a minor percentage component thereof ranging from trace quantities up to about 50 percent by weight, preferably from about 0.5 to about 5.0 percent by weight. The gas stream remaining after removal of the $SO_2$ therefrom is utilized or handled in any conventional manner. For example, gas streams containing minor percentage amounts of $SO_2$ are frequently produced in power generation or in mining or smeltering operations as stack gases which are discharged to the atmosphere and wherein the presence of $SO_2$ is ecologically undesired. In such situations it is desirable to be able to remove most of such minor proportion amounts of $SO_2$ efficiently and at low cost prior to the release of the stack gas to the atmosphere while avoiding adding to the stack gas, and thereby to the environment, other materials which have significant adverse ecological effect. Generally speaking, in addition to the removal of $SO_2$ from the stack gas prior to discharge to the atmosphere, it is also desired to have a process which can recover the sulfur value of the $SO_2$ in a readily usable or saleable form. The present invention provides such a process.

The present invention also contemplates the treatment of an aqueous system containing free $SO_2$ or combined $SO_2$ such as $H_2SO_3$. For example, a solution of $H_2SO_3$ can be formed by contacting water with $SO_2$. Such an aqueous system is contacted with carboxymethoxysuccinic acid or a water soluble salt thereof to produce an aqueous complex containing $SO_2$ and carboxymethoxysuccinic acid or the salt thereof. Preferably thereafter, the complex is treated with $H_2S$ to regenerate the carboxymethoxysuccinic acid or salt thereof and liberate sulfur which is recovered. In this aspect of the present invention, the carboxymethoxysuccinic acid or water soluble salt thereof is supplied to the contacting step in the form of an aqueous solution or in a particulate solid form.

DETAILED DESCRIPTION OF THE INVENTION

Sulfur dioxide, $SO_2$, is a useful material in many ways; however, there are instances where its presence even in small quantities as for example in media such as stack gas, or water, is very much undesired. Ecological reasons frequently make desirable a low cost process for removing $SO_2$ from gases or liquids and which does not itself produce significant additional contamination of the environment. A successful process for removing $SO_2$ from a stream containing the same, at low cost, using an inexpensive readily available recyclable absorbent material that is not destroyed or lost from the system in appreciable quantities, and which is not significantly harmful to the environment could provide considerable benefit to industry as well as individuals. The $SO_2$ containing stack gas problem is serious enough at present; however, it is likely to become more severe as time passes and natural gas becomes more difficult to obtain necessitating increased use of fuel oil or coal containing appreciable percentages of sulfur.

Stack gases containing sulfur dioxide are produced in numerous chemical processing operations, in refining of minerals and in electrical power generation. The sulfur dioxide may arise from the oxidation of sulfur or of a compound thereof contained either in a fuel or in a mineral being processed. In any event, the attendant discharge of $SO_2$ in a stack gas may have adverse effect upon adjacent animate or inanimate objects, such as clothing; paint on autos, homes and office buildings; and on plant or animal life.

The present invention is based upon the discovery that a low cost, innocuous material can be used as an absorbent for $SO_2$. This material has excellent properties in such use and when absorption of $SO_2$ thereby has occurred, the material can be easily treated for removal of the absorbed $SO_2$ permitting recycle of the absorbent to minimize losses thereof. In addition, processes using the invention can recover sulfur value from the $SO_2$ absorbed thereby offsetting at least part of the costs of operating the removal process.

The material used for $SO_2$ removal in accordance with the present invention is carboxymethoxysuccinic acid or a water soluble salt thereof. This material is readily produced at low cost by reacting salts of maleic acid and glycolic acid in an aqueous alkaline medium containing alkaline earth metal cations such as calcium. The alkaline earth metal salts thus obtained are readily converted to (1) acid by acidification with a mineral acid such as sulfuric acid or (2) to alkali metal salts, typically by reaction with sodium carbonate. Further details regarding the preparation of carboxymethoxysuccinic acid and the water salts thereof are set forth in U.S. Pat. No. 3,692,685. Although the present invention contemplates that the absorbents thereof are recovered and recycled to minimize losses, carboxymethoxysuccinic acid and its salts have excellent biodegradability characteristics as measured by conventional standard tests and they are very mild if brought in contact with living organisms. Thus even if the recovery of adsorbents is less than complete so that losses to the environment are experienced, the effect upon the environment of such losses is not particularly adverse.

In the practice of the present invention, contact preferably is established in an aqueous system between $SO_2$ or a derivative thereof and carboxymethoxysuccinic acid or a water soluble salt thereof. The manner of bringing about the contact is not especially critical and may consist simply of bringing a gaseous stream containing $SO_2$ into contact with a solution of carboxymethoxysuccinic acid or a water soluble salt thereof. Typical methods of contacting are well known and include spray chambers, bubble plate or packed towers, falling flim reactors, and the like, which are known to those of skill in the art. Alternately, contact may be established simply by bubbling the $SO_2$-containing gas through a mass of the solution.

In some instances it may not be desired to have a direct contact between the gaseous stream containing $SO_2$ and the solution of carboxymethoxysuccinic acid or a salt thereof. In other instances, the $SO_2$ may be available as a water solution, a solution of $H_2SO_3$, for example. In such situations, the carboxymethoxysuccinic acid or water soluble salt thereof or a solution thereof may be combined with the water solution of $SO_2$, or $H_2SO_3$. Preferably the resulting mixture is then processed to recover the sulfur value as disclosed in the foregoing, preferably by heating or especially by reaction with $H_2S$.

The precise mechanism involved in the absorption operation is not known; however, it appears that $SO_2$ is solubilized by the water to form $H_2SO_3$ in ionic form and that $(HSO_3)^-$ ion forms with the anion of carboxymethoxysuccinic acid a complex from which the $(HSO_3)^-$ may be removed subsequently by heating or by reaction with $H_2S$ to form elemental sulfur. Thus the anion of carboxymethoxysuccinic acid is regenerated and can be returned to the $SO_2$ contacting system.

Factors of considerable importance in regard to the use of carboxymethoxysuccinic acid in the present invention are the low vapor pressure thereof and the stability thereof even at elevated temperatures. Although the precise reason for the highly stable nature of carboxymethoxysuccinic acid in connection with the present invention is not known with certainty, it is believed that the absence of hydroxyl group substitution on the carbon chain provides a molecule that is less subject to change at elevated temperatures than molecules having —OH groups such as citric acid. The matter of thermal stability of the absorbent is an important factor even when intended operation is at temperatures of the order of 25°–60°C due to localized overheating, temperature upsets, and the like. Carboxymethoxysuccinic acid decomposes only slowly even when heated to 190°C.

The ability of an aqueous solution of carboxymethoxysuccinic acid or a salt thereof to remove $SO_2$ from a gaseous stream or to retain $SO_2$ or a complex thereof depends to some extent upon each of acid or salt concentration, pH, temperature and pressure. Although important, these conditions are not critical.

The solutions of carboxymethoxysuccinic acid or salt thereof used range in concentration from a trace of the acid or salt therein to a saturated solution thereof. It is readily evident that solutions containing a trace of acid or salt will provide some effect, particularly where trace quantities of $SO_2$ are involved. Operation with supersaturated solutions is generally less preferred because of the tendency toward formation of deposits in piping, in contacting chambers, etc. A preferred concentration range is from about 0.01 to about 0.7 molar solution of the acid or salt.

The pH of the solution of acid or salt used for absorption ranges generally from the minimum pH of solutions of carboxymethoxysuccinic acid to the maximum pH of solutions of alkali metal salts of carboxymethoxysuccinic acid; however, the range can be extended or an intermediate pH obtained with a partial salt condition; i.e., a molecule with both —COOH and —COOM components. Such extension is readily obtained by the addition of other acids or bases or by mixing carboxymethoxysuccinic acid and sodium carboxymethoxysuccinate. Thus pH's of from about 2.5 to about 8.0 are preferred with a narrower intermediate pH range of from about 3.0 to about 4.2 being especially preferred for best effectiveness, particularly from about 3.6 to about 4.2. Useful acids to decrease pH are compatible mineral acids such as $H_2SO_4$ or HCl while useful bases are alkali metal hydroxides, oxides, carbonates or bicarbonates, typically sodium carbonate.

The temperature of the acid or salt solution used for absorption ranges from about 0°C to about 100°C. Higher temperatures generally require the use of superatmospheric pressures to minimize water losses from the solutions. Lower temperatures are usable but ordinarily are not practical due to cooling expenses. In general, the useful solubility of $SO_2$ in water decreases with temperatures and accordingly operation at a temperature below 100°C is usually preferred. A preferred range of temperature of the solution of acid or salt used in the absorption operation is from about 20° to about 60°C. Although the temperature of the gases supplied to the absorption operation may vary from this temperature range, it is usually preferred that any such variation be small to avoid or minimize heat exchange requirements for the solution.

The pressure of the absorption operation is not critical. Superatmospheric as well as subatmospheric pressures are useful. In most instances, off gases from fuel combustion or smelter operations are discharged at about atmospheric pressure or within one or two psig thereof and pumping costs for changing this pressure more than one or two psig are prohibitively expensive. Thus usual pressures are in a rane of from about 50 percent below to about 50 percent above atmospheric pressure, preferred pressures being from about 20 percent below to about 20 percent above atmospheric pressure.

The process of the present invention preferably employs a second step recovery operation whereby carboxymethoxysuccinic acid or the salt thereof is recovered from the complex thereof with $SO_2$ produced in the contacting step. Conditions used in this step usually are similar to those of the contacting step since it is ordinarily too costly to bring about much of a change in such aspects as temperature and pressure in view of the large volumes of gases and the low concentration of $SO_2$ usually encountered.

The preferred form of recovery operation utilizes a chemical reactant to react with the complex to form a material readily separable from the balance of the resulting system and which does not require physical conditions which are vastly different from those of the collecting step. Preferably the carboxymethoxysuccinic acid or salt solution is regenerated and sulfur is produced in a form which is readily separated from the solution so that the acid or salt solution may be recycled directly without the need for further extensive treatment. A preferred chemical reactant is $H_2S$. This material reacts with the complex to produce colloidal sulfur. In an alternate recovery process the complex is heated preferalby under reduced pressure to drive off $SO_2$ which is removed by a suitable reaction. Although the expenditure of energy for pressure or temperatures may be required in this recovery process, it provides an overall process wherein a gaseous stream containing a low concentration of $SO_2$ is converted into a more concentrated form of $SO_2$. Another procedure for removing $SO_2$ from the complex with carboxymethoxysuccinic acid or salt thereof to regenerate the solution as an effective absorbent for additional $SO_2$ is by sparging the complex-containing aqueous system with an inert stripper gas. Although time-consuming and not as effective as a chemical reaction, this procedure can be performed under the conditions previously set forth for absorption. A typical stripper gas is nitrogen.

The following examples indicate preferred embodiments of the present invention.

EXAMPLE I

261 Grams (0.75 mol) of sodium carboxymethoxysuccinic acid pentahydrate was dissolved in 1000 ml water in a two-liter flask. The solution pH was brought to 4.15 by the addition of HCl. $SO_2$ was bubbled into the solution in the flask until 15.7 grams (0.245 mol) was absorbed.

To test the ability of the solution to retain $SO_2$, nitrogen was sparged through the solution at room temperature and at a rate of 25 liters per hour. 1 milliliter aliquots were withdrawn at intervals and titrated with 0.1563 N $Na_2S_2O_3$ after addition of excess 0.966 N iodine solution. A sample analyzed prior to the sparging contained 0.513 milliequivalents of $SO_2$ per milliliter. After 6 hours sparging with nitrogen, the $SO_2$ content of the solution had dropped only slightly to 0.497 meq. $SO_2$/milliliter which is about 97 percent of the starting $SO_2$. After a total of 70 hours of sparging with nitrogen the solution had dropped to 0.341 meq. $SO_2$/milliliter or 66 percent of the starting $SO_2$, 34 percent of the $SO_2$ absorbed initially having been removed in the sparging operation.

The solution was then treated by bubbling in $H_2S$. Sulfur formed as a colloidal precipitate.

EXAMPLE II

A solution of sodium carboxymethoxysuccinic acid pentahydrate was prepared as in Example I; however, it was partly neutralized to a pH of 3.3 and 15.9 grams (0.248 mol) of $SO_2$ absorbed. The solution contained 0.525 milliequivalents of $SO_2$ per milliliter. After sparging with nitrogen at a rate of 25 liters per hour for 6 hours, the $SO_2$ content of the solution had dropped to 0.419 milliequivalents $SO_2$ per milliliter. After a total of 26 hours sparging with nitrogen, the $SO_2$ content of the solution had dropped to 0.244 milliequivalents per milliliter or 46 percent of the initial $SO_2$ absorbed.

EXAMPLE III

In a comparative example, 210 grams (1.0 mol) of citric acid was dissolved in 1000 ml of water. Solution pH was brought to 3.55 by the addition of 80 grams $Na_2CO_3$. $SO_2$ was bubbled in until 14.5 grams (0.226 mol) was absorbed. The solution contained 0.525 milliequivalents of $SO_2$ per milliliter. The solution was then sparged with nitrogen as in Example I. After 19 hours of sparging, the solution had dropped to 0.426 milliequivalents of $SO_2$ per milliliter or 81 percent of the $SO_2$ present at the start of the sparging. After a total of 63 hours of sparging with nitrogen, the $SO_2$ content of the solution had dropped to 0.280 milliequivalents of $SO_2$ per milliliter or to 53 percent of the $SO_2$ absorbed initially.

On treatment with $H_2S$, a colloidal precipitate of sulfur formed as in Example I.

The absorption and sparging portion of this example was repeated with an initial solution pH of 4.2 with similar results in regard to absorption and removal of $SO_2$.

I claim:

1. A process for collecting $SO_2$ which comprises contacting gaseous $SO_2$ with an aqueous solution of carboxymethoxysuccinic acid or a water soluble salt thereof to produce a complex containing $SO_2$ and carboxymethoxysuccinic acid or the salt thereof.

2. The process of claim 1 wherein the pH is from about 2.5 to about 8.0.

3. The process of claim 1 wherein the temperature is from about 0°C to about 100°C.

4. The process of claim 1 wherein the pH is from about 2.5 to about 8.0 and the temperature is from about 0°C to about 100°C.

5. The process of claim 1 wherein the carboxymethoxysuccinic acid or salt thereof is subsequently recovered from the complex.

6. The process of claim 1 wherein the complex is treated with $H_2S$ whereby carboxymethoxysuccinic acid or the salt thereof is regenerated and sulfur is liberated as a by-product.

7. The process of claim 1 wherein the gaseous $SO_2$ is a minor percentage component in a gas stream.

8. A process for removing $SO_2$ from a gaseous stream containing $SO_2$ which comprises bringing said stream into contact with an aqueous solution of carboxymethoxysuccinic acid or a water soluble salt thereof whereby $SO_2$ is removed from said stream forming a complex containing $SO_2$ and carboxymethoxysuccinic acid or the salt thereof.

9. The process of claim 8 which includes treating the complex with $H_2S$ to regenerate the carboxymethoxysuccinic acid or the salt thereof and liberate sulfur, removing the sulfur and returning the carboxymethoxysuccinic acid or the salt thereof to the bringing into contact step providing a cyclic operation.

10. A process for removing $SO_2$ or $H_2SO_3$ from an aqueous system, which comprises, contacting said system with carboxymethoxysuccinic acid or a water soluble salt thereof to produce an aqueous complex containing $SO_2$ and carboxymethoxysuccinic acid or the salt thereof, treating said complex with $H_2S$ to regenerate the carboxymethoxysuccinic acid or the salt thereof and liberate sulfur, and recovering sulfur liberated.

* * * * *